May 28, 1946.  O. H. WEBB  2,401,281
COMPOSITE STRUCTURE
Filed April 10, 1942

INVENTOR.
OSCAR H. WEBB.
BY Leon M. Straun

Patented May 28, 1946

2,401,281

UNITED STATES PATENT OFFICE 2,401,281

COMPOSITE STRUCTURE

Oscar H. Webb, New York, N. Y.

Application April 10, 1942, Serial No. 438,379

4 Claims. (Cl. 154—45.9)

This invention concerns improvements in or relating to composite structures, such as plywood, particularly adapted for industrial use.

It is an object of the present invention to provide new composite or plywood structures of the armored type having exceptional qualities.

A further object of the present invention is to provide a new composite material having superior characteristics, which material may be worked upon and shaped by any conventional process, which can be manufactured at low cost and in very economical ways and which contributes to the solution of many problems often presented in various fields of industry, although the outer appearance of said material is not at all different from composite material of the ordinary or usually employed type.

It is another object of the present invention to provide means in combination with plywood elements for obtaining lightweight, strong and durable bonded structures suitable for many industrial and commercial purposes.

Still another object of the present invention is to incorporate means in plywood panels or the like creating products of higher structural qualities than those obtained from ordinary or known plywood panels.

It is still a further object of the present invention to provide armoring means connected with plywood elements resulting in novel plywood structures of high efficiency which are substantially bullet-proof or nearly non-penetratable by and resistant to missiles.

Yet, another object of the present invention is to provide reinforced plywood parts, panels or structural elements which lend themselves readily to many applications and variations according to desired usage and installation.

It is still a further object of the present invention to provide means interposed in structures composed of layers, said means being capable of retarding impacts upon said structure caused by missiles or the like.

Still another object of the present invention is to provide layer structures including strata of reinforcements made of minute parts or strips of steel or metal, of plastic or hard substances or of non-shatterable material, such as composite glass or the like, which reinforcements do not inordinately increase the weight of the layer structure but contribute considerably to high structural values of the final element or product attained.

Yet, a further object of the present invention is to provide a reinforced layer or composite material, such as plywood, the reinforcements thereof being built up by loose and compacted waste material, such as metal shavings, steel wool, or by solid metal parts arranged in spaced relation and in staggered or echelon formation, thus effecting a structure with unusual properties heretofore not known in the art.

This invention accordingly consists in the features of construction, combination of parts and in the unique relations of said parts and in the relative proportioning and disposition thereof; all as more completely outlined herein.

The invention further contemplates particular and specific methods of manufacturing and assembling new composite structures of the aforesaid nature.

To enable others skilled in the art so fully to comprehend the underlying features thereof that they may embody the same by the numerous modifications in the structure and relation contemplated by this invention, a drawing depicting certain forms of the invention has been annexed as a part of this disclosure, and in such drawing, like characters of reference denote corresponding parts throughout all the views, of which:

Figure 1:
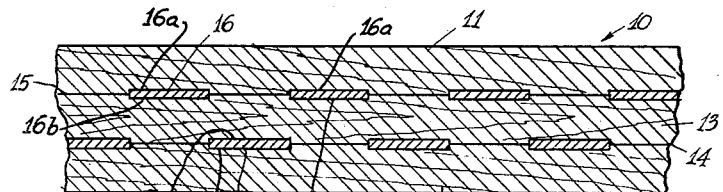
Fig. 1 is a cross-sectional view of a part of a plywood structure showing an embodiment of the invention.

Referring now particularly to the drawing, there is disclosed in Fig. 1 an embodiment of the invention, such as plywood structure 10 having two outer wood layers 11 and 12 and intermediate wood layer 13. Between layers 11 and 13 and 12 and 13 and along their joints 15 and 14, there are disposed reinforcing or armoring means 16, 17, in this instance, strips of reinforcing material arranged in spaced apart and staggered relation. Said strips may be interposed between the layers and extend within groove 16a of layer 11 and groove 16b of layer 13 and extend transversely of layers 11 and 13. Similarly, reinforcing strip material 17 is positioned within groove 17a of lower layer 12 and groove 17b of intermediate layer 13. Although the reinforcing material as shown in the drawing is in the form of relatively small flat metal strips, such as steel strips, it is well understood that in place of strips compressed or compacted loose or minute metal particles may be inserted or joined with the respective layers and placed in said grooves to attain an armored or reinforced plywood structure or assembly 10, which is bonded along its joints 14, 15 by any known and suitable adhesive means. Instead of metal other substances or materials may be employed for the purpose intended, such as material from any known plastic composition, hard rubber or rubber-like substances or glass, particularly of the non-shatterable or composite type.

Figure 2:
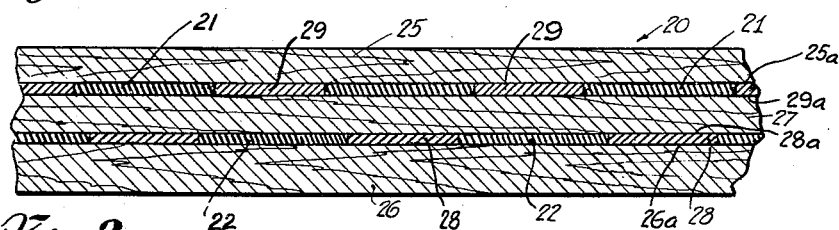
Fig. 2 is a cross-sectional view of a part of a plywood structure showing a modified embodiment of the invention.

Fig. 2 shows similarly to Fig. 1 a plywood structure 20 having outer layers 25, 26 and intermediate layer 27, the inserts or inner reinforcements, such as, for example, thin metal layer strips or strata 21 and 22 being located in overlapping position with respect to each other and between respective wooden layer sections 28 and 29.

Layers 25, 26 and 27 are bonded or joined together at and along joints 25a, 26a, 28a and 29a by any suitable adhesive means, for example, plastic or thermoplastic resinous substances of any known composition.

Figure 3:
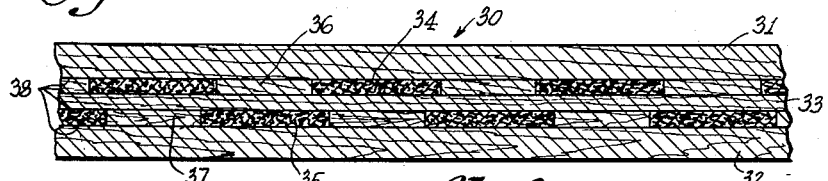
Fig. 3 is a cross-sectional view of a part of a plywood structure showing the invention in another modified form.

Fig. 3 shows a multi-layer structure or assembly 30 having outer relatively heavier wood layers 31 and 32 and intermediate wood layer 33. Inserted in or otherwise suitably connected to wooden layers 36 and 37 which are bonded along joints 38 to upper layer 31 and intermediate layer 33 on the one hand and to lower layer 32 and intermediate layer 33 on the other hand, there are disposed reinforcing elements 34, 35, respectively, in spaced apart and staggered relation, the reinforcing elements or means 34 and 35, in this instance, being positioned in layers 36, 37 in such manner that the respective ends of said elements overlap each other. It will be noted, that the inserts or filling means 16, 17 of Fig. 1 being each of equal width and thickness, are disposed in such manner that their respective side edges or ends are in alignment with one another and do not overlap in vertical direction. In distinction from the embodiment of Fig. 1, the embedded elements 34, 35 of Fig. 3 may consist at least partly of the hereinabove mentioned compressed steel wool material or wire nettings.

Figure 4:
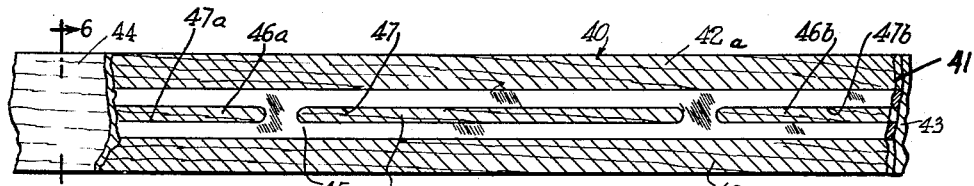
Fig. 4 is a plan view, partly in section, of a plywood structure showing a still further modification of the invention.

Fig. 4 shows a three layer plywood structure 40 with upper layer 44, lower layer 43, and intermediate layer 41. In lengthwise direction of said layers 41, 43 and 44 there are disposed reinforcing means, such as element 45 having perforations or longitudinal slots 47, 47a, 47b arranged in spaced apart relation. Within the respective slots there may be inserted filler layers 46, 46a, 46b of wood or other suitable material, which together with parts 42a and 42b of intermediate layer 41 are joined to adjacent layers 44 and 43 by any known adhesive or binding substance.

Figure 6:
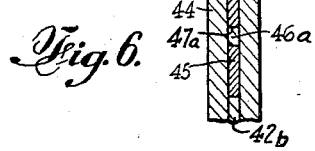
Fig. 6 is a cross-sectional view taken along line 6—6 of the structure illustrated in Fig. 4.

It may be well realized, that arrangement and connections of the reinforcing means in larger plywood structures may be carried out in similar fashion, as disclosed with respect to the embodiments shown in Figs. 1 to 3. Fig. 6 illustrates a cross-sectional view of structure 40 taken along line 6—6 of Fig. 4.

Figure 5:
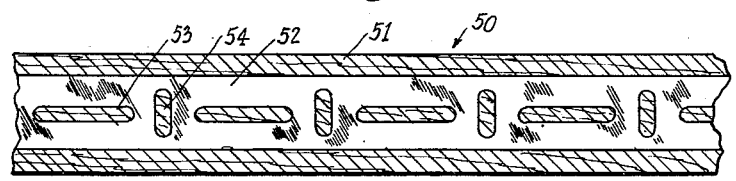
Fig. 5 is a top plan and sectional view of a part of a plywood structure of still another modified form of the invention.

Fig. 5 in distinction from Figs. 4 and 6 shows for the sake of simplicity intermediate layer 51 of plywood structure 50 (similar to that shown in Fig. 4) with reinforcing or armoring inlay, in this instance, in the form of a strip or band 52 of thin steel having perforations or slots 53, 54 extending in different directions (e. g. at right angles and parallel) with respect to each other, as clearly depicted in Fig. 5. Function and result of reinforcing means 52 indicated in Fig. 5 are similar to those described with reference to Figs. 4 and 6.

It is, of course, understood that any desired number of layers or plies may be employed for the assembly or structure to be obtained and that all or only predetermined layers may contain or embrace reinforcing strips or means, the width of the latter being preferably reduced in size with respect to the width of its layer and the material of said reinforcing means being relatively stronger and harder than that of said layers.

The individual reinforcing means may be placed in different directions between or in their respective wooden layers, either lengthwise and/or transversely of the layers, whereby the reinforcing means in their entirety and by virtue of their relative arrangement may extend over or cover the whole area of the structure. It is to be observed, that this construction and arrangement of reinforcing means with respect to the plywood layers leaves sufficient surface area at adjacent wooden layers for the purpose of gluing, binding and uniting them together whereby the character of the plywood structure may always be maintained.

In contradistinction to other structures heretofore developed, the present invention provides for the disposition or interposition of armoring elements sectionwise within the assembly of plywood or like fibrous layer structures. These elements may be spaced apart in the same plane as well as in different planes within said fibrous layers. The invention further provides for the disposition of the armoring elements in such manner that they may be applied to the wooden layers by any known metal spraying process or that they may be embraced by adjacent wooden layers of the plywood or like assembly as disclosed hereinabove.

This results in a considerable increase of the strength and stability of the assembly or structure without substantially affecting its yieldability or resiliency and also in the improvement of its resistibility to impacts and percussions due to shocks, the thus built-up structure offering a remarkable obstruction to missiles or similar objects after impingement thereof upon structures made in accordance with this invention.

It can thus be seen that there has been provided according to the present invention a reinforced wooden structure comprising a plurality of wooden layers arranged to each other in superposed position and in plywood fashion, spaced wooden sections connected with and extending between adjacent layers, reinforcing means embraced by said adjacent layers and said spaced sections, said reinforcing means being wider than the width of said spaced sections but being substantially of the same height as said spaced sections, and binding means connecting said wooden layers and said wooden sections together, whereby a laminated structure is obtained whose layers are so connected with one another in lengthwise direction thereof that the continuity of connection between said layers is interrupted by said reinforcing means, which enhance resistance to penetration through said layers in vertical direction thereto.

While there has been shown and described and pointed out the fundamental novel features of the invention as applied to the above embodiments, it will be understood that various admissions and substitutions and changes in the form and details of the means illustrated and operation thereof may be made by those skilled in the art without departing from the spirit of the invention.

Having thus described the invention what is claimed as new and desired to be secured by Letters Patent is:

1. A reinforced wooden structure comprising a plurality of wooden layers arranged in superposed position and plywood fashion, spaced wooden sections united with and extending between adjacent layers, said sections being arranged in staggered relation to each other between said layers, whereby surface areas of respective wooden layers adjacent said sections are bonded with each other, reinforcing means positioned intermediate said spaced sections and being wider than the width of said sections but having substantially the same height as said sections, and binding means adhesively bonding said wooden layers and said spaced wooden sections with one another.

2. A reinforced wooden structure comprising a plurality of wooden layers arranged in superposed position and plywood fashion, spaced wooden sections united with adjacent layers, said sections being arranged in staggered relation to each other between said layers, whereby surface areas of respective wooden layers adjacent said sections are bonded with each other, reinforcing metal strata positioned intermediate said spaced sections and being wider than the width of said sections but having substantially the same height as said sections, and binding means adhesively bonding said wooden layers and said spaced wooden sections with one another.

3. A reinforced wooden structure comprising a plurality of wooden layers arranged to each other in superposed position and in plywood fashion, spaced wooden sections connected with and extending between adjacent layers, reinforcing means embraced by said adjacent layers and said spaced sections, said reinforcing means being wider than the width of said spaced sections but being substantially of the same height as said spaced sections, and binding means connecting said wooden layers and said wooden sections together, whereby a laminated structure is obtained whose layers are so connected with one another in lengthwise direction thereof that the continuity of connection between said layers is interrupted by said reinforcing means, which enhance resistance to penetration through said layers in vertical direction thereto.

4. As an article of manufacture, a structural element comprising at least three layers, outer layers and an intermediate layer, respectively, each made of fibrous material and arranged in superposed position to each other, spaced apart layer sections of fibrous material disposed in staggered relation to each other and positioned between said outer layers and said intermediate layer, means joining said outer layers through said layer sections with said intermediate layer, and reinforcing means made of a material relatively harder than said fibrous material and arranged intermediate said spaced apart layer sections, said reinforcing means being disposed in staggered overlapping lateral relation to each other and being substantially of the same height as that of said layer sections.

OSCAR H. WEBB.